G. W. HUFFMAN.
HORSE RELEASER.
APPLICATION FILED OCT. 24, 1907.

957,340.

Patented May 10, 1910.
2 SHEETS—SHEET 1.

Witnesses
J. C. Miller
John Stewart

Inventor
George W. Huffman,
By
Chandler Chandler
Attorneys.

G. W. HUFFMAN.
HORSE RELEASER.
APPLICATION FILED OCT. 24, 1907.
957,340.
Patented May 10, 1910.
2 SHEETS—SHEET 2.
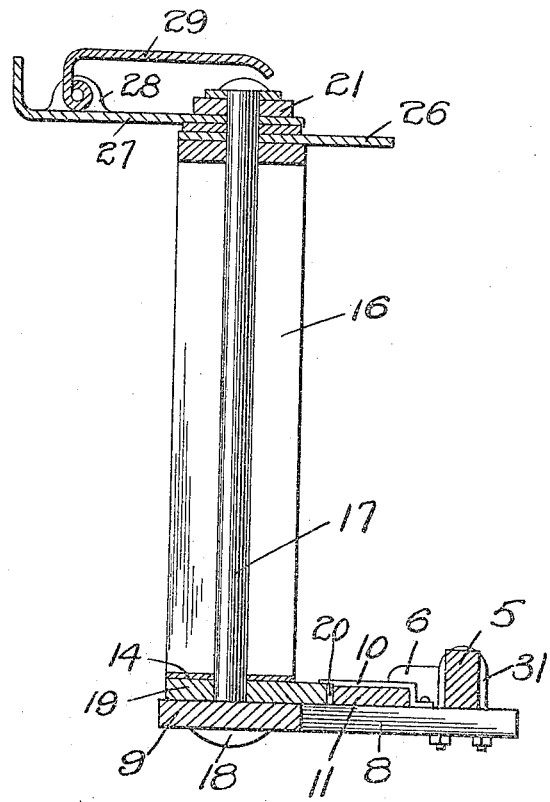
Fig. 3.
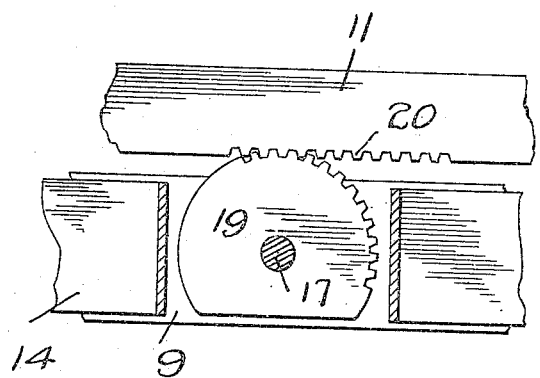
Fig. 4.
Inventor
George W. Huffman,
Attorneys.

UNITED STATES PATENT OFFICE.

GEORGE W. HUFFMAN, OF BUCKHORN, MISSOURI.

HORSE-RELEASER.

957,340. Specification of Letters Patent. Patented May 10, 1910.

Application filed October 24, 1907. Serial No. 399,043.

*To all whom it may concern:*

Be it known that I, GEORGE W. HUFFMAN, a citizen of the United States, residing at Buckhorn, in the county of Madison, State of Missouri, have invented certain new and useful Improvements in Horse-Releasers; and I do hereby declare the following to be a full, clear, and exact description of the invention, such as will enable others skilled in the art to which it appertains to make and use the same.

This invention relates to new and useful improvements in horse releasers and it has more particular reference to a horse releaser comprising in its broad conception, a slidable rod provided with shaft connections and manually operated means for slidably moving the said rod in the operation of releasing a horse. In connection with a horse releaser of the above type, the invention aims as a primary object to provide a novel construction, combination and arrangement of parts, comprehending the means above referred to for operating the slidable rod.

The invention aims as a further object to provide a slidable rod involving novel structural details, having relation to the engagement of said rod with the vehicle shafts.

The details of construction will appear in the course of the following description, in which reference is had to the accompanying drawings, forming a part of this specification, like characters of reference designating similar parts, throughout the several views, wherein:—

Figure 1:
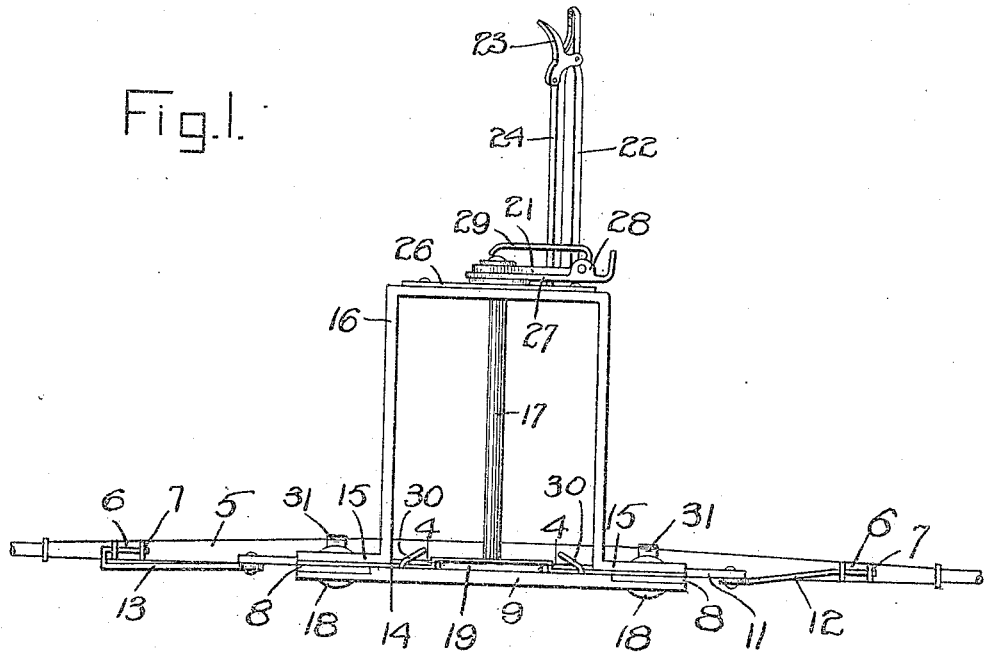
Figure 2:
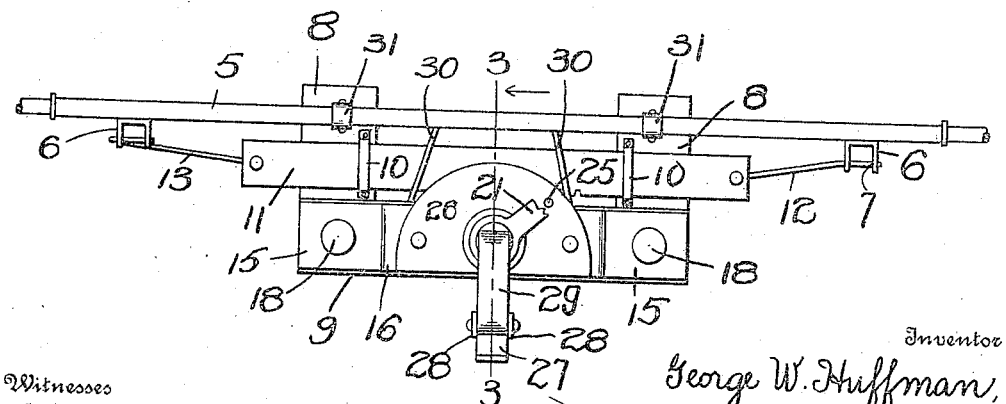

Figure 1 is a front elevation of a horse releaser, constructed in accordance with the present invention. Fig. 2 is a top plan view thereof. Fig. 3 is a longitudinal vertical section on the line 3—3 of Fig. 2. Fig. 4 is a fragmentary horizontal section through the standard immediately above the pinion segment.

In the accompanying drawings, the numeral 5 designates the axle tree provided at the ends thereof with U-shaped clips 6, having apertures 7. Projecting forwardly from the axle tree 5, is a supporting frame including parallel side bars 8, and a front cross bar 9. The side bars 8 are provided with straps 10 which constitute guides for a flat slidable beam 11 carrying at one end a straight pin 12 for engagement in the apertures 7 of the adjacent clip 6 and at its other end carrying a recurvately bent pin 13 for engagement in the apertures 7, of the remaining clip 6.

Upon the cross bar 9, a bearing strap 14 is mounted and imposed upon the strap 14 are the angular extensions 15 of the legs of a standard 16 of inverted U-shape, the cross part of the said standard and the raised central portion of the strap 14, serving as bearings for a vertical shaft 17. The extensions 15 and the ends of the strap 14 are held upon the cross bar 9 by common fastening means 18. The shaft 17 carries at its lower end, between the raised portion of the strap 14 and the cross bar 9, a pinion segment 19 which meshes with rack teeth 20 formed at the front edge of the beam 11. The shaft 17 carries at its upper end an arm 21, having a vertically extending handle portion 22 to which is secured a pivoted spring held trigger 23 operatively connected to a sliding pawl 24, which works through a suitable opening in the arm 21 and is designed in the normal position of the parts, to engage in an opening 25 formed in a plate 26 secured upon the upper cross bar of the standard 16.

Surrounding the shaft 17, for rotation thereabout, is a member 27, formed at its end with ears 28 between which is pivoted the end of an arm 29 which is movable to a vertical position, in which position, said arm engages beneath the cross bar connecting the shafts and constitutes a shaft holder for holding said shafts in an elevated position when not in use. In such use of the shaft holding attachment, the member 27 is rotated so that its arm 29 is disposed adjacent one side of the standard 16, this position being at a substantial right angle to the position of said arm shown in Fig. 2.

The frame which supports the various operating elements is reinforced by braces 30 having connection with the axle tree 5 and with the cross bar 9. It will be understood that the U-shaped bolts 31, which are employed between the axle tree and the axle body as fastenings therefor are likewise fastening means for the supporting frame, and in this function, pass through the ends of the bars 8.

In operation, the horse is freed from the vehicle by moving the handle 22 from the position shown to a position central of the standard 16, during which movement, the beam 11 will be moved axially by the agency of the pinion 19, and in such axial movement of the beam 11, the pins 12 and 13 carried at the ends thereof, will be moved out of the openings in the clips 6, whereby the shafts are disconnected therefrom and the horse runs free of the vehicle.

The invention is simple in its structural details, inexpensive to manufacture, and practical and efficient in use.

What is claimed is:

The combination with an axle and its shaft engaging clips, of a frame projecting forwardly of the axle, the said frame being detachably connected to said axle, and including spaced parallel side bars and a front cross bar, alining guide straps mounted on the side bars of the frame, a beam slidable in the guide straps and resting upon the side bars, rack teeth formed on one longitudinal edge of the beam, rigid pins pivotally connected to opposite ends of the beam and their free extremities being adapted to engage in the shaft clips, a bracket rising from the front cross bar of the frame, a vertical shaft journaled in the cross bar and bracket, a cog gear fixed near the lower end of the shaft and meshing with the rack teeth, a perforated segment projecting laterally from the bracket, and a throw lever fixed to the upper end of the shaft and having a locking pawl engaging in the perforated segment to hold the lever in adjusted position.

In testimony whereof, I affix my signature, in presence of two witnesses.

GEORGE W. HUFFMAN.

Witnesses:
    MINNIE S. HOVIS,
    FRED WARD.